United States Patent [19]
Ancona et al.

[11] Patent Number: 5,490,454
[45] Date of Patent: Feb. 13, 1996

[54] FOODSTUFF TREATING DEVICE

[75] Inventors: Bruce Ancona, New York, N.Y.;
Edward H. Kilduff, Weehawken, N.J.

[73] Assignee: B. Via International Housewares, Inc., Englewood Cliffs, N.J.

[21] Appl. No.: 371,748

[22] Filed: Jan. 12, 1995

[51] Int. Cl.⁶ .......................... A47J 19/06; A47J 42/34; B30B 9/02; B02C 19/08
[52] U.S. Cl. .................... 99/510; 83/431; 83/932; 99/495; 99/537; 241/95; 241/169.1; 241/DIG. 27; 100/125
[58] Field of Search .......................... 99/495, 510, 537, 99/538; 30/196, 278, 279.2, 302; 83/431, 932; 241/95, 169.1, DIG. 27; 100/234, 112, 125

[56] References Cited

U.S. PATENT DOCUMENTS

| | | | |
|---|---|---|---|
| 487,339 | 12/1892 | Webb | 241/95 |
| 2,776,616 | 1/1957 | Sarossy | 100/234 |
| 2,818,797 | 1/1958 | Ballor | 83/431 |
| 3,552,460 | 1/1971 | Cooney | 241/169.1 |
| 3,580,168 | 5/1971 | Zysset | 99/495 |
| 3,581,790 | 6/1971 | Del Conte | 241/169.1 |
| 3,583,454 | 6/1971 | Borner | 241/95 |
| 4,069,752 | 1/1978 | Ahner | 100/234 |
| 4,311,283 | 1/1982 | Bounds | 241/95 |
| 4,348,950 | 9/1982 | Harris | 99/495 |
| 4,366,930 | 1/1983 | Trombetti, Jr. | 241/169.1 |
| 4,393,588 | 7/1983 | Kowalski | 30/196 |
| 4,466,346 | 8/1984 | Gemelli | 99/495 |
| 4,545,299 | 10/1985 | Ahner | 99/495 |
| 4,560,473 | 12/1985 | David | 241/79 |
| 4,582,265 | 4/1986 | Petronelli | 99/495 |
| 4,714,205 | 12/1987 | Steinko | 241/95 |
| 4,794,854 | 1/1989 | Swaim | 99/495 |
| 5,097,597 | 3/1992 | Bianchi | 30/120.2 |
| 5,101,720 | 4/1992 | Bianchi | 99/506 |
| 5,163,362 | 11/1992 | Gaber et al. | 99/495 |
| 5,165,335 | 11/1992 | Bianchi | 99/495 |
| 5,303,640 | 4/1994 | Gaber et al. | 99/495 |
| 5,370,044 | 12/1994 | Lackie | 99/495 |

*Primary Examiner*—Timothy F. Simone
*Attorney, Agent, or Firm*—Henry D. Pahl, Jr.

[57] ABSTRACT

In the device disclosed, a foodstuff is placed in a carrier which can be rotated eccentrically around and over the face of a blade providing a circular cutting track by means of a plunger which is slidable within the carrier and can be gripped by a user to rotate the carrier while exerting pressure on a foodstuff contained in the carrier thereby to work the foodstuff against the cutting track.

12 Claims, 2 Drawing Sheets

FOODSTUFF TREATING DEVICE

BACKGROUND OF THE INVENTION

The present invention relates to a device for treating a foodstuff and more particularly to such a device which facilitates the grating and/or slicing of a foodstuff such as a clove of garlic. While the prior art contains many examples of devices designed to slice and/or to grate a foodstuff, such as a clove of garlic, many of these devices are difficult to operate and require separate means for collecting the foodstuff product. Further, the treatment may tend to be non-uniform.

Among the several objects of the present invention, may be noted that the provision of a novel device for treating of foodstuff; the provision of such a device which facilitates slicing and/or grinding of a foodstuff, such as a clove of garlic; the provision of such a device which is easy to and intuitive to operate; the provision of such a device which incorporates means for catching or containing the foodstuff treated; the provision of such a device which is easily assembled; the provision of such a device which is easily cleaned; the provision of such a device which is easily assembled; the provision of such a device which is reliable and which is of relatively simple and inexpensive construction. Other objects and features will be in part apparent and in part pointed out hereinafter.

SUMMARY OF THE INVENTION

A device for treating a foodstuff in accordance with the present invention involves a housing and, supported in that housing, a flat blade providing, on at least one face thereof, a circular cutting track. A carrier providing a cylindrical, open ended cavity is journaled with respect to the housing for eccentric motion around the center of the cutting track with the axis of the cavity being essentially perpendicular to the blade. A plunger is axially slidable within the cavity for pressing a foodstuff placed in the cavity against the blade. One end of the plunger is provided with a grip enabling a user to rotate the carrier while exerting pressure on a foodstuff thereby to work the foodstuff against the cutting track.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
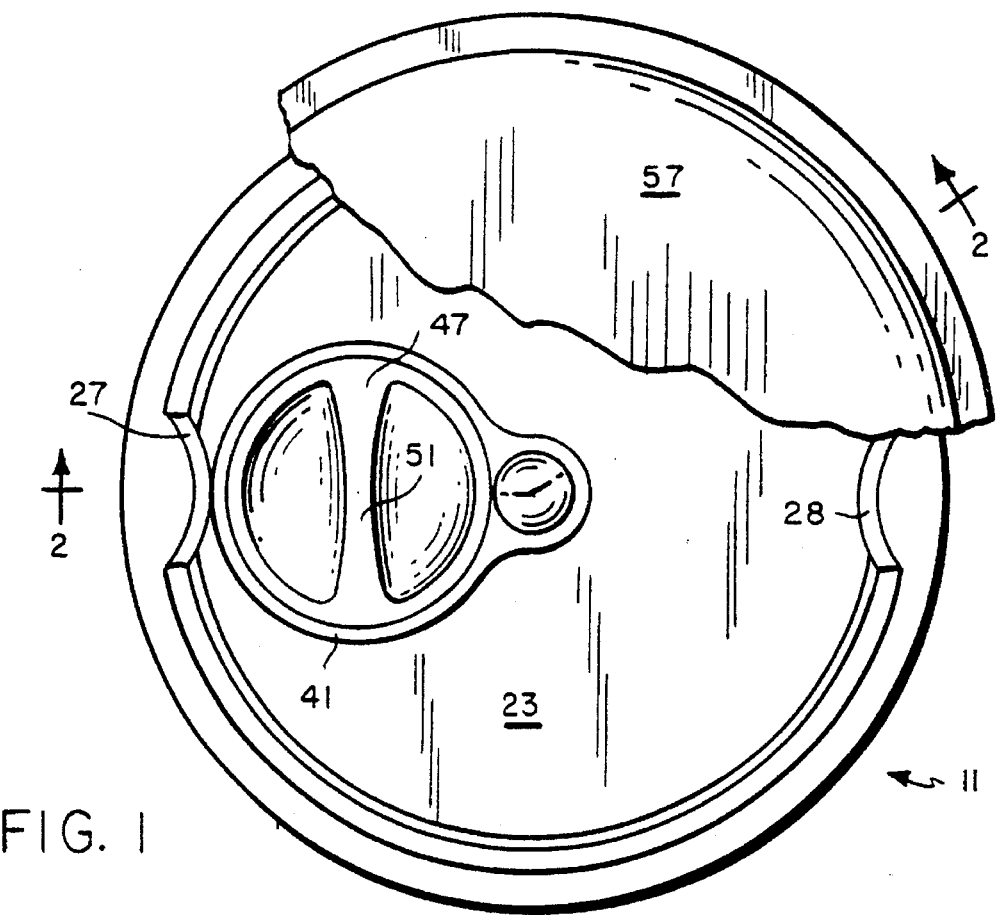
FIG. 1 is a top view of a foodstuff treating device in accordance with the present invention.
Figure 2:
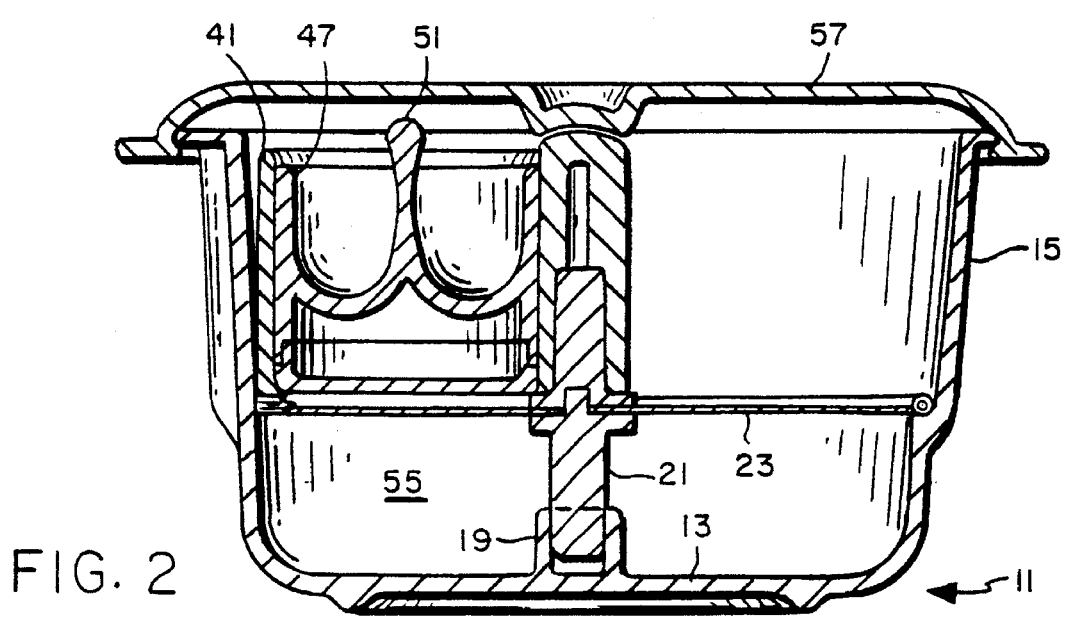
FIG. 2 is a sectional view taking substantially on line 2—2 of FIG. 1.

Referring now to the drawings, the device illustrated therein is built up on a cup or bowl like housing which is designated generally by reference character 11 and which comprises a bottom portion 13 and a annular side wall 15. The bottom portion 13 includes a socket 19 for receiving an axle or spindle 21. Spindle 21 carries a circular blade 23 and the side wall portion 15 of the housing 11 includes a step or shoulder 25 for supporting the rim of the blade 23. Preferably, the spindle 21 is constructed in two adhesively joined parts, as illustrated, with the blade 23 captured between the two parts. The housing 11 preferably includes interior ribs 27 and 28 which engage corresponding notches in the periphery of the blade 23 so as to prevent rotation thereof. Other means for preventing rotation will be readily apparent to those skilled in the art.

Figure 3:
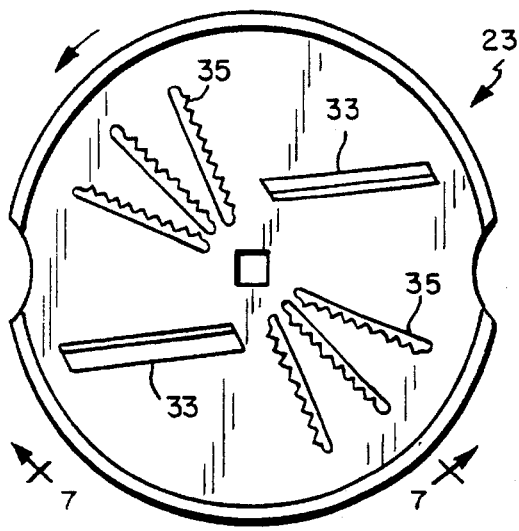
FIG. 3 is a top view of a blade used in the device of FIG. 1.
Figure 6:
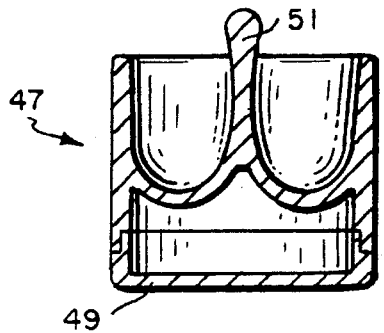
FIG. 6 is a side view, in section, of a plunger used in cooperation with the carrier of FIG. 5.
Figure 4:
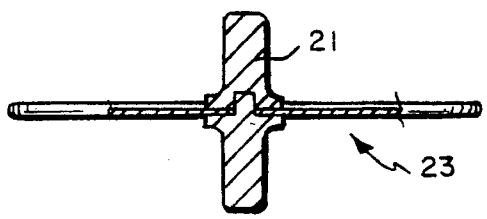
FIG. 4 is a side view, with parts broken away, of the blade of FIG. 3 mounted on a spindle.
Figure 5:
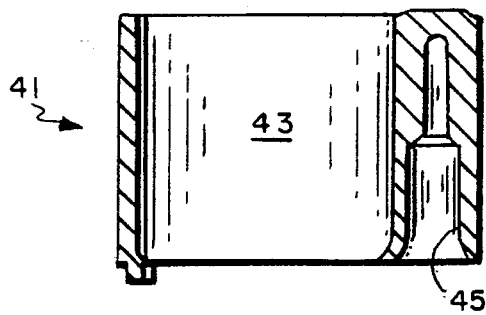
FIG. 5 is a side view, in section, of a carrier used in the device of FIG. 1.
Figure 7:
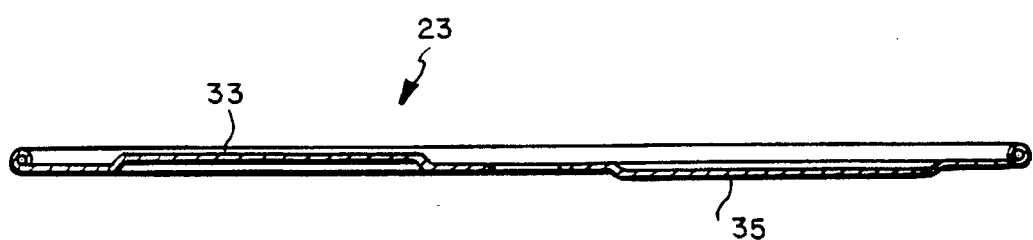
FIG. 7 is a side view, in section and to enlarged scale, of the blade of FIG. 3.

The spindle 21 is preferably symmetrical so that either end can be inserted in the socket 17, thereby to permit either side of the blade 23 to face upwardly, the upper face of the blade being the operative face as described hereinafter. The blade 23 preferably is stamped and apertured as illustrated in FIGS. 3 and 7 to provide, on one side, raised elongate slicing blades 33 and on the other side short raised teeth 35 suitable for grating. The cutting edges 33 and the teeth 35 are each arranged to provide a circular cutting track around the center of the blade 23.

The end of the axle 21 which is not inserted in the housing socket 17 serves as a spindle for journalling a carrier designated generally by a reference character 41. Carrier 41 provides a cylindrical open-ended cavity 43 for receiving a foodstuff with a socket 45 attached to one side of the cavity for receiving the spindle 21 so that the cavity can rotate eccentrically around the center of the blade 23.

A plunger 47 is provided which can be slid axially (vertically) within the cavity 43 for pressing a foodstuff placed in the cavity against the blade 23. The plunger 47 is generally cylindrical having a closed bottom 49 and a transverse web 51 providing a finger grip.

To treat or process the foodstuffs, such as a clove of garlic, the user merely inserts the blade and spindle assembly into the housing with the selected cutting edges or teeth facing upwardly and then places the carrier 41 over the upper end of the spindle. With the foodstuff placed within the cavity 43, the user can press foodstuff down with the plunger 47, while at the same time using the plunger to rotate the carrier eccentrically around the circular track, thereby working the foodstuff against the selected cutting track provided by the blade. The treated foodstuff will pass through the blade into the bottom portion, designated by reference 55, of the housing 11. When a sufficient quantity of the foodstuff has been treated, the carrier and the blade/spindle assembly can be removed and the treated foodstuff emptied from the bowl-like housing.

Preferably, the device is provided with a snap on cap 57 to protect the device to keep the parts of the device collected and protected when not in use. An advantage of this design is that the device is of relatively simple construction and essentially all parts, other than the relatively simple metal blade, may be relatively simply constructed by molding from a suitable plastic resin.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A device for treating a foodstuff, said device comprising:
   a housing;
   supported in said housing, a flat blade providing, on at least one face thereof, a circular cutting track;
   a carrier providing an open ended cavity, said carrier being journaled with respect to said housing for eccentric motion around the center of said track; and
   a plunger slidable within said cavity for pressing a foodstuff placed in said cavity against said blade, one end of said plunger being provided with a grip enabling a user to rotate said carrier while exerting pressure on a contained foodstuff thereby to work the foodstuff against said cutting track.

2. A device as set forth in claim 1 wherein said cutting track is perforate so that the foodstuff being treated passes through said blade.

3. A device as set forth in claim 2 in which said housing is bowl-like and said blade divides the interior of the bowl into an upper part in which said carrier rotates and a lower part which receives treated foodstuff.

4. A device as set forth in claim 3 wherein the bottom of said housing includes a central socket and wherein said blade is mounted on a spindle one end of which can be held in said socket and the other end of which provides an axle around which said carrier rotates.

5. A device as set forth in claim 4 wherein said spindle is symmetrical and said blade provides cutting tracks on both sides.

6. A device as set forth in claim 5 wherein said cutting tracks provide different cutting characteristics.

7. A device for treating a foodstuff, said device comprising:
   a bowl-like housing;
   supported in said housing, a flat circular blade providing, on at least one face thereof, a circular perforate cutting track, said blade dividing the interior of said bowl into an upper space and a lower space;
   a carrier providing a cylindrical, open ended cavity, said carrier being journaled with respect to said housing in said upper space for eccentric motion around the center of said track with the axis of the cavity and the axis of said motion being essentially perpendicular to said blade; and
   a plunger axially slidable within said cavity for pressing a foodstuff placed in said cavity against said blade, one end of said plunger being provided with a grip enabling a user to rotate said carrier while exerting pressure on a contained foodstuff thereby to work the foodstuff against said cutting track, the treated foodstuff being received in said lower space.

8. A device as set forth in claim 7 wherein said housing includes a shoulder for supporting the periphery of said blade.

9. A device as set forth in claim 8 wherein the bottom of said housing includes a central socket and wherein said blade is mounted on a spindle one end of which can be held in said socket and the other end of which provides an axle around which said carrier rotates.

10. A device as set forth in claim 9 wherein said spindle is symmetrical and said blade provides cutting tracks on both sides.

11. A device for treating a foodstuff, said device comprising:
    a flat circular blade providing, on each face thereof, a perforate circular cutting track;
    a spindle extending through the center of said blade symmetrically on either side;
    a bowl-like housing having a central socket for receiving one end of said spindle and an annular shoulder for supporting the periphery of said blade, said blade dividing the interior of said housing into an upper part and a lower part;
    a carrier providing a cylindrical open ended cavity, said carrier being journaled on the other end of said spindle for eccentric motion around the center of said track with the axis of the cavity and the axis of said motion being essentially perpendicular to said blade; and
    a plunger axially slidable within said cavity for pressing a foodstuff placed in said cavity against said blade, one end of said plunger being provided with a grip enabling a user to rotate said carrier while exerting pressure on a contained foodstuff thereby to work the foodstuff against said cutting track, the treated foodstuff being received in said lower part.

12. A device as set forth in claim 11 further including a cover for said housing which encloses and retains said blade, said carrier and said plunger.

* * * * *